United States Patent
Showa et al.

(10) Patent No.: US 11,915,720 B2
(45) Date of Patent: Feb. 27, 2024

(54) SPINDLE MOTOR AND HARD DISK DRIVE DEVICE

(71) Applicant: MINEBEA MITSUMI Inc., Nagano (JP)

(72) Inventors: Hideaki Showa, Kitasaku-gun (JP); Daigo Nakajima, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/177,340

(22) Filed: Mar. 2, 2023

(65) Prior Publication Data

US 2023/0298625 A1    Sep. 21, 2023

(30) Foreign Application Priority Data

Mar. 17, 2022  (JP) ................................ 2022-042333

(51) Int. Cl.
G11B 19/20    (2006.01)
(52) U.S. Cl.
CPC ...... *G11B 19/2054* (2013.01); *G11B 19/2009* (2013.01)
(58) Field of Classification Search
CPC ............ G11B 19/2045; G11B 33/022; G11B 19/2009; G11B 2220/2009; G11B 33/023; G11B 25/043; G11B 5/8404; G11B 5/73; G11B 5/72; G11B 5/82; G11B 5/4806; H02K 11/215; H02K 1/28; H02K 7/003; H02K 7/085; H02K 11/33; H02K 29/08
USPC ........................................ 360/99.08
See application file for complete search history.

(56) References Cited

U.S. PATENT DOCUMENTS 7,995,306 B2 * 8/2011 Uenosono ............. F16C 33/107
360/99.08
2002/0064324 A1    5/2002 Yamada

FOREIGN PATENT DOCUMENTS

JP    2002-168240 A    6/2002

* cited by examiner

*Primary Examiner* — Nabil Z Hindi
(74) *Attorney, Agent, or Firm* — Pearne & Gordon LLP

(57) ABSTRACT

The spindle motor includes; a shaft including a shaft portion and a flange portion, the shaft portion having a columnar shape extending in an axial direction, the shaft portion including a shaft end portion, the flange portion being provided at the shaft end portion and receiving a load in the axial direction; and a bearing sleeve rotatably supporting the shaft, the bearing sleeve having a tubular shape including a sleeve end portion having a large-diameter recess part formed in the axial direction. The shaft is a member formed of a copper alloy containing from 0.5 mass percent to 1.5 mass percent of silicon and from 0.5 mass percent to 3.0 mass percent of manganese, and the member includes the shaft portion and the flange portion integrated with one another.

7 Claims, 7 Drawing Sheets

SPINDLE MOTOR AND HARD DISK DRIVE DEVICE

CROSS-REFERENCE TO RELATED APPLICATIONS

This application claims the benefit of priority to Japanese Patent Application Number 2022-042333 filed on Mar. 17, 2022. The entire contents of the above-identified application are hereby incorporated by reference.

TECHNICAL FIELD

The disclosure relates to a spindle motor and a hard disk drive device.

BACKGROUND

A type of spindle motor supporting a shaft by a bearing sleeve is provided with a flange-like thrust plate to receive a load in an axial direction on the shaft.

For example, JP 2002-168240 A discloses the technology of a spindle motor using a forged product having a shaft and a thrust plate integrated with one another. In such a spindle motor, when the shaft is made of an iron, the bearing sleeve is occasionally made of a copper alloy (yellow brass, brass) in order to improve wear resistance between the shaft and the bearing sleeve.

SUMMARY

However, when the bearing sleeve is made of a copper alloy, it is difficult to attach a counter plate made of an iron for closing an opening of the bearing sleeve by welding. Therefore, an outer periphery of the bearing sleeve is covered with a sleeve case made of an iron, and the counter plate and the sleeve case are welded to one another. As a result, the manufacturing cost of the spindle motor is increased.

The disclosure has been made in view of the above circumstances, and an object is to provide a spindle motor not requiring a sleeve case for covering a bearing sleeve while maintaining the wear resistance between a shaft and the bearing sleeve.

In order to solve the above-described problems, a spindle motor includes: a shaft including a shaft member and a flange portion, the shaft member having a columnar shape extending in an axial direction, the shaft member including a shaft end portion, the flange portion being provided at the shaft end portion and receiving a load in the axial direction; and a bearing sleeve rotatably supporting the shaft, the bearing sleeve having a tubular shape including a sleeve end portion having a first opening part formed in the axial direction. The shaft is a member formed of a copper alloy containing from 0.5 mass percent to 1.5 mass percent of silicon and from 0.5 mass percent to 3.0 mass percent of manganese, and the member includes the shaft member and the flange portion integrated with one another.

According to the disclosure, wear resistance between the shaft and the bearing sleeve of the spindle motor is maintained, while a sleeve case covering the bearing sleeve is not required.

DESCRIPTION OF EMBODIMENTS

Hereinafter, embodiments of the disclosure will be described with reference to the drawings. However, while various technically preferable limitations for carrying out the disclosure are attached to the embodiments described below, the scope of the disclosure is not limited to the following embodiments and illustrated examples.

Hard Disk Drive Device

Figure 1:
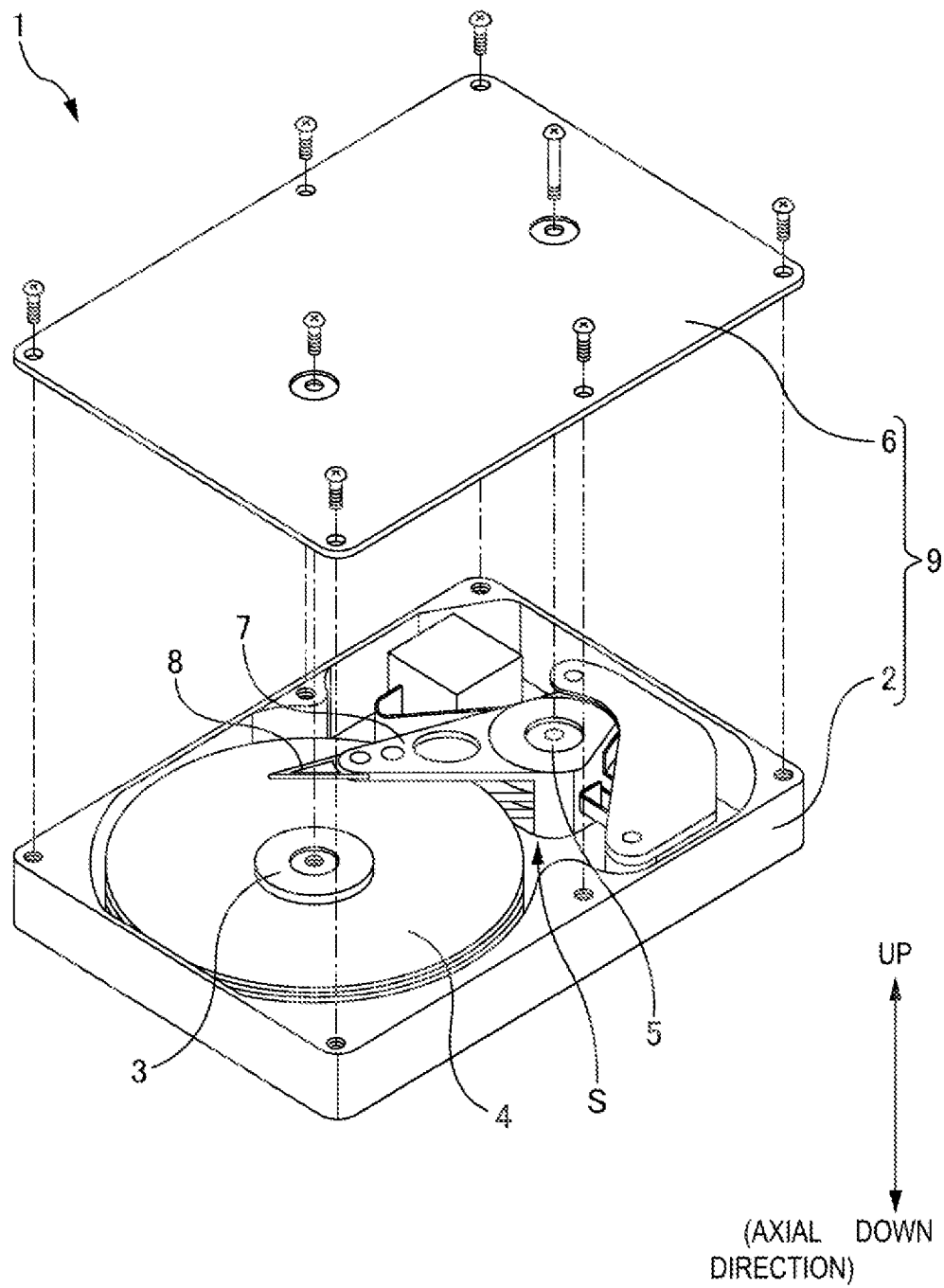
FIG. 1 is a perspective view of a hard disk drive device 1.

FIG. 1 is a perspective view illustrating a configuration of a hard disk drive device 1. The hard disk drive device 1 includes a case 2, a spindle motor 3, recording disks 4, a bearing device 5, and a cover 6.

The case 2 has an approximately rectangular box-like shape with a bottom having one surface opened. The spindle motor 3, the recording disks 4, and the bearing device 5 are disposed inside the case 2. The spindle motor 3 rotatably supports the plurality of recording disks 4. The plurality of recording disks 4 are supported by the spindle motor 3 such that respective disk surfaces are opposed to one another. Clearances are formed between the respective recording disks 4. The bearing device 5 swingably supports a plurality of swing arms 7 disposed in the clearances between the respective recording disks 4. Magnetic heads 8 are disposed at tip portions of the swing arms 7. The magnetic heads 8 are members for imparting magnetism to the recording disks 4 or reading magnetism from the recording disks 4. The cover 6 is a plate-like member closing the open surface of the case 2. The cover 6 is sealed together with the case 2 by sealing means to form a housing 9. An internal space S is formed inside the housing 9. The internal space S is filled with air or helium gas having a density lower than the density of air. The internal space S may be filled with, for example, nitrogen gas or a mixed gas of helium and nitrogen in addition to air or helium gas.

When the spindle motor 3 rotates, the recording disks 4 also rotate. In this state, when the swing arms 7 swing, the magnetic heads 8 move over the rotating recording disks 4. The magnetic heads 8 impart magnetism to the recording disks 4 or read magnetism from the recording disks 4. In such way, the hard disk drive device 1 can record information on the recording disks 4 and read the information recorded on the recording disks 4.

Spindle Motor

Figure 2:
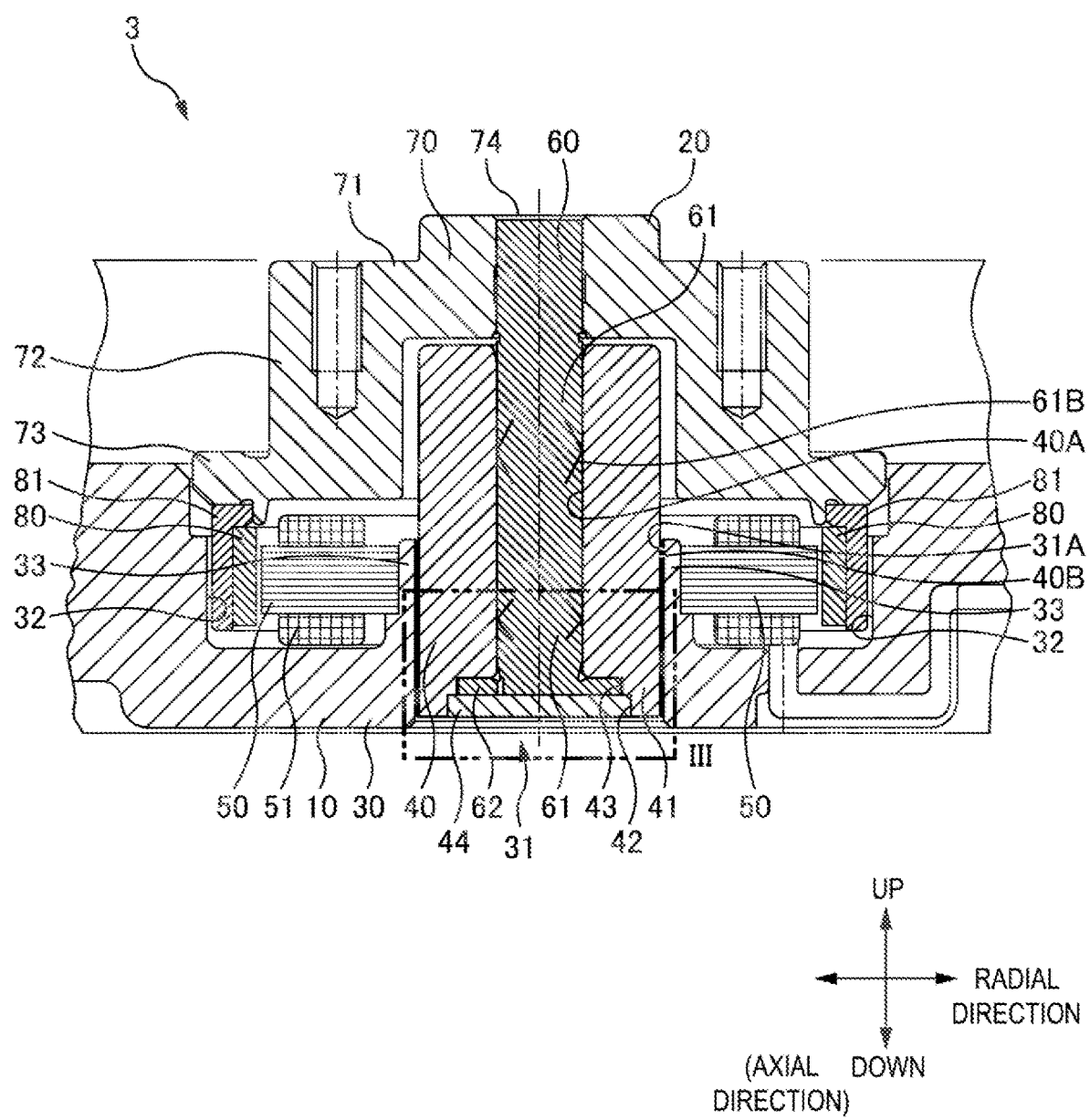
FIG. 2 is a cross-sectional view of a spindle motor 3.

Next, a detailed configuration of the spindle motor 3 will be described. FIG. 2 is a cross-sectional view illustrating the configuration of the spindle motor 3. The spindle motor 3 includes a stationary portion 10 and a rotating portion 20 rotating with respect to the stationary portion 10 via a bearing mechanism.

Here, as illustrated in FIG. 2, for example, a direction parallel to a center axis of a shaft 60 to be described later is defined as an axial direction, a direction around the center axis of the shaft 60 is defined as a circumferential direction, and a direction perpendicular to the axial direction is defined as a radial direction. For the sake of description, the axial direction is defined as an up-down direction, a rotating portion 20 side with respect to the stationary portion 10 is defined as an upper side, and a stationary portion 10 side is defined as a lower side.

Stationary Portion

The stationary portion 10 includes a base plate 30, a bearing sleeve 40, and a stator core 50.

The base plate 30 is a member made of a metal. As illustrated in FIG. 2, a through hole 31, a circumferential groove portion 32, and a circumferential wall portion 33 are formed in the base plate 30. The through hole 31 is a hole for fixing the bearing sleeve 40, and is provided so as to penetrate the base plate 30 in the axial direction. Further, the through hole 31 has a tubular shape, and the inner diameter of the tube is approximately equal to or larger than the outer diameter of the bearing sleeve 40. The circumferential groove portion 32 is formed outside the through hole 31 in the radial direction. The circumferential groove portion 32 is an annular groove provided so as to be coaxial with the center axis of the through hole 31 when viewed in the axial direction. The circumferential wall portion 33 is formed as an annular wall surface portion protruding upward in the axial direction along the through hole 31 from the bottom surface of the circumferential groove portion 32 when viewed in the axial direction. The circumferential wall portion 33 partitions the through hole 31 and the circumferential groove portion 32.

The bearing sleeve 40 is a cylindrical member made of an iron, such as stainless steel rotatably supporting the shaft 60. The bearing sleeve 40 is inserted into the through hole 31 (see FIG. 2). In the state illustrated in FIG. 2, an outer peripheral surface 40B of the bearing sleeve 40 is opposed to an inner peripheral surface 31A of the through hole 31. The bearing sleeve 40 is fixed to the through hole 31 by an adhesive applied between the outer peripheral surface 40B of the bearing sleeve 40 and the inner peripheral surface 31A of the through hole 31.

A large-diameter recess part 42 (an example of a first opening part) opening downward and a small-diameter recess part 43 recessed upward from a top surface of the large-diameter recess part 42 are formed in a sleeve end portion 41 at the lower side of the sleeve end portions 41 in the axial direction of the bearing sleeve 40. The large-diameter recess part 42 and the small-diameter recess part 43 are connected to one another in the axial direction. The outer diameter of the large-diameter recess part 42 is larger than the outer diameter of the small-diameter recess part 43.

A counter plate 44 is attached to the large-diameter recess part 42. The counter plate 44 is a disk-shaped lid closing the large-diameter recess part 42 and the small-diameter recess part 43 from under the bearing sleeve 40. The counter plate 44 is made of an iron, such as stainless steel. The counter plate 44 has a circular shape having an outer diameter approximately equal to the inner diameter of the large-diameter recess part 42. The thickness of the counter plate 44 in the axial direction is approximately equal to the depth of the large-diameter recess part 42.

The counter plate 44 is inserted into the large-diameter recess part 42 from under the large-diameter recess part 42. An outer edge portion of the counter plate 44 and an inner edge portion of the large-diameter recess part 42 are joined together by laser welding. The counter plate 44 is fixed to the bearing sleeve 40 without a clearance and closes the large-diameter recess part 42 and the small-diameter recess part 43.

The stator core 50 is a member formed by stacking a plurality of annular electromagnetic steel plates in the axial direction when viewed in the axial direction. The stator core 50 is disposed inside the circumferential groove portion 32 and is fixed to an outer peripheral surface of the circumferential wall portion 33 by a method such as bonding. The stator core 50 includes a plurality of pole teeth (protruding poles) extending outward in the radial direction and arranged along the circumferential direction. A coil 51 is wound around the pole teeth. When a current flows through the coil 51, the stator core 50 generates a magnetic flux.

Rotating Portion

The rotating portion 20 includes the shaft 60, a rotor hub 70, and a rotor magnet 80.

The shaft 60 is a member serving as a rotation axis of the spindle motor 3, and is rotatably supported inside the bearing sleeve 40. The shaft 60 is a member made of a copper alloy. The copper alloy has a composition containing from 0.5 mass percent to 1.5 mass percent of silicon, from 0.5 mass percent to 3.0 mass percent of manganese, and from 95.5 mass percent to 99.0 mass percent of other components. In the copper alloy, it is preferable for a hard manganese-silicon intermetallic compound to be finely and uniformly dispersed and distributed in a matrix structure of copper. The average particle diameter of the manganese-silicon intermetallic compound is preferably from 1.5 μm to 2.5 μm. Further, the occupied area proportion of the manganese-silicon intermetallic compound is preferably from 2.5 percent to 3.0 percent. As for the particle diameter, the maximum unidirectional diameters are measured, and an average value of the maximum unidirectional diameters is defined as the average particle diameter. The occupied area proportion is calculated from an area value in a specific color tone range by a microscope, such as a digital microscope. The shaft 60 includes a shaft portion 61 (an example of a shaft member), the shaft portion 61 being columnar, and a flange portion 62. In the shaft 60, the shaft portion 61 and the flange portion 62 are integrated with one another.

The shaft portion 61 is a columnar shaft member having shaft end portions 64. The shaft end portion 64 at the lower side is integrally provided with the flange portion 62. The shaft portion 61 is disposed inside the bearing sleeve 40 such that the shaft end portion 64 provided with the flange portion 62 is at the lower side. An outer peripheral surface 61B of the shaft portion 61 is surrounded by an inner peripheral surface 40A. The outer peripheral surface 61B and the inner peripheral surface 40A are opposed to one another with a minute clearance in between.

The flange portion 62 is a toric flange member expanding in the radial direction when viewed in the axial direction. The flange portion 62 is disposed in the small-diameter recess part 43. An upper surface of the flange portion 62 is opposed to a lower surface 40C of the bearing sleeve 40 with a minute clearance in between. A lower surface of the flange portion 62 is opposed to an upper surface of the counter plate 44 with a minute clearance in between. Since the flange portion 62 is disposed between the lower surface 40C and the counter plate 44, the flange portion 62 and the shaft 60 are prevented from moving in the axial direction. The thickness of the flange portion 62 in the axial direction is thinner than the depth of the small-diameter recess part 43 and is from 0.4 mm to 1.0 mm, preferably from 0.5 mm to 1.0 mm, and more preferably from 0.5 mm to 0.9 mm. The outer diameter of the flange portion 62 is smaller than an inner diameter of the small-diameter recess part 43.

A thrust dynamic pressure generating groove is provided in at least one of the upper surface of the flange portion 62 and the lower surface 40C (the upper surface of the flange portion 62 in the present embodiment). The thrust dynamic pressure generating groove is also provided in at least one of the lower surface of the flange portion 62 and a portion of the upper surface of the counter plate 44 opposed to the flange portion 62 (the lower surface of the flange portion 62 in the present embodiment).

Figure 3:
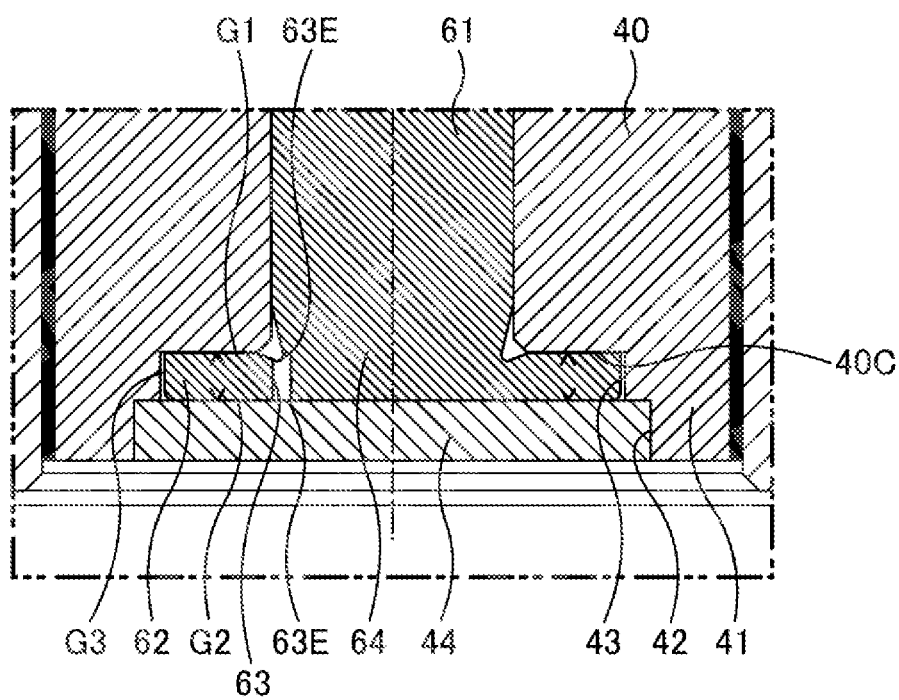
FIG. 3 is an enlarged view of part III in FIG. 2.

In the state illustrated in FIGS. 2 and 3, the minute clearance between the upper surface of the flange portion 62 and the lower surface 40C, and the minute clearance between the outer peripheral surface 61B of the shaft portion 61 and the inner peripheral surface 40A are connected to one another to form an upper minute clearance G1 (an example of one surface side of the flange portion). The lower surface of the flange portion 62 and the upper surface of the counter plate 44 are opposed to one another with a lower minute clearance G2 (an example of the other surface side of the flange portion) in between. Further, the side surface of the flange portion 62 and an inner peripheral surface of the small-diameter recess part 43 are opposed to one another with a side minute clearance G3 in between. The upper minute clearance G1 is connected to the lower minute clearance G2 through the side minute clearance G3. The upper minute clearance G1, the lower minute clearance G2, and the side minute clearance G3 are filled with lubricant oil (not illustrated).

In the shaft portion 61, two opening parts 63E respectively facing the upper minute clearance G1 and the lower minute clearance G2 are formed and a hole 63 is provided between the two opening parts 63E. The hole 63 penetrates the shaft portion 61. The hole 63 has one end connected to the upper minute clearance G1 and the other end connected to the lower minute clearance G2. That is, the upper minute clearance G1 is connected to the lower minute clearance G2 through the hole 63. Burrs are removed from the opening parts 63E (an example of second opening parts) as edge portions forming the hole 63 by electrochemical machining. Here, electrochemical machining is a processing method of putting a metal member into an electrolytic solution, disposing an electrode having a shape conforming to the shape of the metal member in the vicinity of the metal member, and applying a current from the electrode to remove fine burrs of the metal member. In the present embodiment, electrochemical machining is performed on the two opening parts 63E. Electrochemical machining may be performed on only one of the two opening parts 63E. In the present embodiment, only one hole 63 is provided in the shaft portion 61, but a plurality of the holes 63 may be provided in the shaft portion 61.

Radial dynamic pressure generating grooves are provided at at least one of the outer peripheral surface 61B of the shaft portion 61 opposed to the inner peripheral surface 40A and the inner peripheral surface 40A of the bearing sleeve 40. In the embodiment, the radial dynamic pressure generating grooves are formed at the outer peripheral surface 61B in a row continuous in the circumferential direction, and are formed in two rows with an interval in the axial direction.

The rotor hub 70 is attached to an upper end of the shaft 60 and rotates together with the shaft 60. The rotor hub 70 includes a disk portion 71, a cylindrical portion 72, and an outer edge portion 73. The disk portion 71 is a disk-shaped member disposed above the bearing sleeve 40 and is coaxial with the center axis of the shaft 60 when viewed in the axial direction. A through hole 74 is provided at the center of the disk portion 71. By fixing the upper end of the shaft 60 to the through hole 74 by a method such as press-fitting or bonding, the disk portion 71 is fixed to the shaft 60. The lower surface of the disk portion 71 and the upper surface of the bearing sleeve 40 are opposed to one another with a clearance in between. The cylindrical portion 72 is a cylindrical member having a constant thickness in the radial direction and extending downward from the outer edge of the lower surface of the disk portion 71. The inner diameter of the cylindrical portion 72 is larger than the outer diameter of the bearing sleeve 40, and the inner peripheral surface of the cylindrical portion 72 and the outer peripheral surface 40B are opposed to one another with a clearance in between. The outer diameter of the cylindrical portion 72 is the same as the outer diameter of the disk portion 71. The outer edge portion 73 is a member protruding radially outward from the lower end of the cylindrical portion 72 when viewed in the axial direction and extending in a flange shape over the entire circumference in the circumferential direction.

The rotor magnet 80 is an annular member having a magnetic pole structure magnetized in a state of the polarities of N and S being alternately reversed along the circumferential direction when viewed in the axial direction. In the present embodiment, the rotor magnet 80 is attached to an inner peripheral surface of an annular yoke 81 attached to the lower end of the outer edge portion 73. The rotor magnet 80 is located at approximately the same position as the stator core 50 in the axial direction, and is located between the stator core 50 and an inner peripheral surface of the circumferential groove portion 32 in the radial direction. The yoke 81 suppresses leakage of magnetic flux from the rotor magnet 80. Note that the cylindrical portion 72 or the outer edge portion 73 may be disposed between the stator core 50 and the inner peripheral surface of the circumferential groove portion 32, and the annular yoke 81 may be attached to the inner peripheral surface of the cylindrical portion 72 or an inner peripheral surface of the outer edge portion 73. In the above case, the rotor magnet 80 is attached to the inner peripheral surface of the yoke 81 so as to be opposed to the stator core 50.

Operation of Spindle Motor

When the coil 51 is energized, magnetic attractive forces and magnetic repulsion forces generated between the magnetic poles of the rotor magnet 80 and the pole teeth of the stator core 50 are switched. As a result, the rotating portion 20 rotates using the shaft 60 as the rotation axis with respect to the stationary portion 10.

The shaft 60 rotates with respect to the bearing sleeve 40. Here, the lubricant oil is pressurized by the radial dynamic pressure generating groove, and thus a dynamic pressure is generated in the lubricant oil. By the generated dynamic pressure, the shaft 60 is supported in a non-contact state in the radial direction with respect to the bearing sleeve 40.

As the shaft 60 rotates, the flange portion 62 rotates with respect to the bearing sleeve 40 and the counter plate 44. Here, the lubricant oil is pressurized by the thrust dynamic pressure generating groove provided in at least one of the upper surface of the flange portion 62 and the lower surface 40C of the bearing sleeve 40, and the thrust dynamic pressure generating groove provided in at least one of the lower surface of the flange portion 62 and a portion opposed to the flange portion 62 at the upper surface of the counter plate 44, and thus a dynamic pressure is generated in the lubricant oil. By the generated dynamic pressure, the flange portion 62 is supported in a non-contact state in the axial direction with respect to the bearing sleeve 40 and the counter plate 44.

When the dynamic pressure is generated in the lubricant oil, the lubricant oil circulates through the upper minute clearance G1, the lower minute clearance G2, and the side minute clearance G3. A part of the lubricant oil flows from the upper minute clearance G1 to the lower minute clearance G2 or from the lower minute clearance G2 to the upper minute clearance G1 through the hole 63. As a result, the lubricant oil smoothly circulates through the minute clearances.

Effect

The spindle motor 3 in the above-described embodiment includes: the shaft 60 including the shaft portion 61 and the flange portion 62, the shaft portion 61 having a columnar shape extending in the axial direction, the shaft portion 61 including the shaft end portion 64, the flange portion 62 being provided at the shaft end portion 64 and receiving a load in the axial direction; and the bearing sleeve 40 rotatably supporting the shaft 60, the bearing sleeve 40 having a tubular shape and including the sleeve end portion 41 having the large-diameter recess part 42 formed in the axial direction. The shaft 60 is a member formed of a copper alloy containing from 0.5 mass percent to 1.5 mass percent of silicon and from 0.5 mass percent to 3.0 mass percent of manganese, and the member includes the shaft portion 61 and the flange portion 62 integrated with one another.

Conventionally, one of the shaft 60 and the bearing sleeve 40 is made of a copper alloy and the other is made of an iron to improve wear resistance between the shaft 60 and the bearing sleeve 40. However, when the bearing sleeve 40 is made of a copper alloy, it is difficult to attach the counter plate 44 made of an iron to the bearing sleeve 40 by welding. Therefore, a sleeve case made of an iron covering the outer periphery of the bearing sleeve 40 is attached to the bearing sleeve 40, and the counter plate 44 and the sleeve case are joined by welding. According to the above-described configuration, since the shaft 60 is made of a copper alloy containing silicon and manganese, the wear resistance between the shaft 60 and the bearing sleeve 40 is improved by having the bearing sleeve 40 made of an iron. The counter plate 44 made of an iron is joined to the bearing sleeve 40 made of an iron by welding. As a result, the counter plate 44 can be attached to the bearing sleeve 40 without attaching a sleeve case made of an iron to the bearing sleeve 40. That is, it is possible to provide the spindle motor 3 without the need for a sleeve case for covering the bearing sleeve 40 while maintaining the wear resistance between the shaft 60 and the bearing sleeve 40.

Since a sleeve case is not required, the spindle motor 3 can be manufactured at a cost lower than a cost of a spindle motor 3 having the bearing sleeve 40 made of a copper alloy by the component cost of the sleeve case and the cost of attaching the sleeve case to the bearing sleeve 40.

In addition, according to the above-described configuration, in the shaft 60, since the shaft portion 61 and the flange portion 62 are integrated with one another, the strength of the flange portion 62 against an input in the axial direction is higher than in the case of the shaft 60 including the shaft portion 61 and the flange portion 62 bonded to one another with an adhesive. As a result, the shaft 60 can support a larger load in the axial direction.

Since the shaft portion 61 and the flange portion 62 are integrated with one another, the shaft 60 does not require a joint portion for joining the shaft portion 61 and the flange portion 62 with an adhesive. Accordingly, the thickness of the flange portion 62 in the axial direction can be reduced. As a result, the length in the axial direction of the bearing sleeve 40 supporting the shaft 60 can be increased, and thus the rigidity of the shaft 60 against an input in the radial direction is increased.

Further, since the shaft 60 includes the shaft portion 61 and the flange portion 62 integrated with one another, a positional deviation occurring when the flange portion 62 is assembled to the shaft portion 61 does not occur. As a result, the positional accuracy of the flange portion 62 with respect to the shaft portion 61 is higher than the positional accuracy in the case of the shaft 60 including the shaft portion 61 and the flange portion 62 as separate bodies.

In addition, the shaft portion 61 of the spindle motor 3 according to the present embodiment forms the hole 63 having one end connected to the upper minute clearance G1 at one surface side of the flange portion 62, and the other end connected to the lower minute clearance G2 at the other surface side of the flange portion 62.

According to such a configuration, since the lubricant oil flows from the upper minute clearance G1 to the lower minute clearance G2 or from the lower minute clearance G2 to the upper minute clearance G1 through the hole 63, the lubricant oil smoothly circulates through the upper minute clearance G1, the lower minute clearance G2, and the side minute clearance G3. In addition, since the lubricant oil circulates through the minute clearances, the dynamic pressure generated in the lubricant oil is adjusted to have approximately the same magnitude in the minute clearances. As a result, the shaft 60 is easily supported in a non-contact state with respect to the bearing sleeve 40 and the counter plate 44.

In addition, at least one of one end and the other end of the hole 63 of the spindle motor 3 according to the present embodiment is formed by the opening part 63E, the opening part 63E being electrochemically machined.

With such a configuration, burrs formed at the opening parts 63E when the hole 63 is processed are removed, and the opening parts 63E are smoothly formed. As a result, since the lubricant oil can smoothly pass through the hole 63, the lubricant oil can easily circulate through the minute clearances.

The thickness of the flange portion 62 of the spindle motor 3 in the axial direction according to the present embodiment is from 0.5 mm to 0.9 mm.

With such a configuration, since the thickness of the flange portion 62 in the axial direction is small, the length in the axial direction of the bearing sleeve 40 supporting the shaft 60 can be increased. As a result, the rigidity of the shaft 60 against an input in the radial direction is increased.

The spindle motor 3 according to the present embodiment further includes a counter plate 44 laser-welded to the bearing sleeve 40 so as to close the large-diameter recess part 42.

Since the small-diameter recess part 43 is filled with the lubricant oil, when the counter plate 44 is joined to the bearing sleeve 40, the adhesive preferably does not enter the small-diameter recess part 43. With the above configuration, the counter plate 44 is joined to the bearing sleeve 40 by laser welding. As a result, the adhesive does not enter the lubricant oil.

The hard disk drive device 1 according to the present embodiment includes the spindle motor 3 described above.

With such a configuration, the hard disk drive device 1 includes the spindle motor 3 having high wear resistance between the shaft 60 and the bearing sleeve 40, and thus is unlikely to break down.

Further, since the manufacturing cost of the spindle motor 3 is low, the hard disk drive device 1 can be manufactured at a low cost.

Since the hard disk drive device 1 includes the spindle motor 3 supportable of a larger load in the axial direction, the number of the recording disks 4 supported by the spindle motor 3 can be increased. In other words, a recording capacity of the hard disk drive device 1 can be increased.

In addition, the hard disk drive device 1 includes the spindle motor 3 having high rigidity against an input in the radial direction, and thus is unlikely to break down even when the input in the radial direction is applied to the hard disk drive device 1.

MODIFIED EXAMPLE

The respective modifications described below may be applied in combination.

(1) Modification 1

Figure 4:
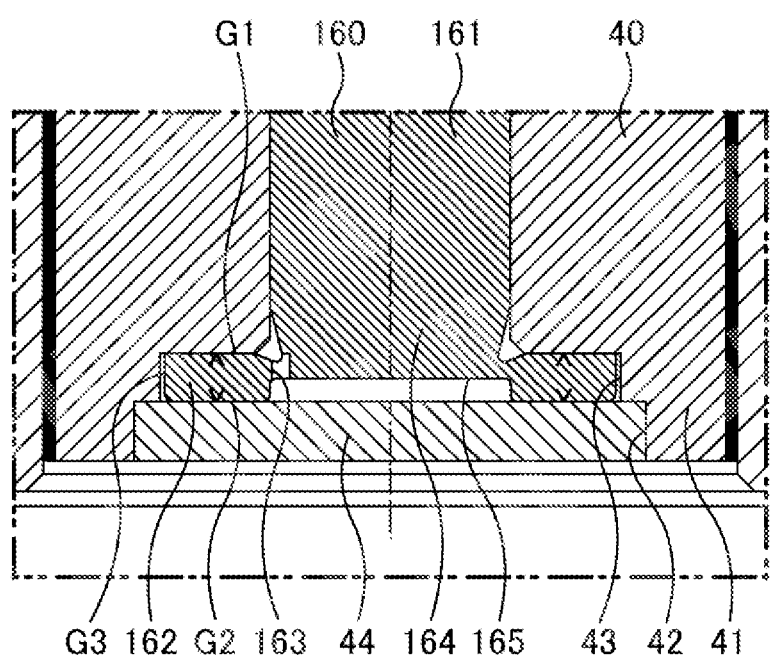
FIG. 4 is an enlarged view of FIG. 2 illustrating the spindle motor 3 including a shaft 160.

As illustrated in FIG. 4, a shaft portion 161 of a shaft 160 may have a recess part 165 having a depth in the axial direction at a shaft end portion 164 provided with a flange portion 162.

The recess part 165 is formed in the shaft end portion 164 in a circular shape when viewed in the axial direction, and opens downward. The recess part 165 connects to the lower minute clearance G2. The diameter of the recess part 165 is approximately equal to the outer diameter of the shaft portion 161. The depth of the recess part 165 is shallower than the thickness of the flange portion 162. A hole 163 is connected to the recess part 165. The hole 163 is provided in the shaft portion 161 and connects the upper minute clearance G1 to the recess part 165. That is, the upper minute clearance G1 and the lower minute clearance G2 are connected to one another through the hole 163 and the recess part 165.

Figure 5:
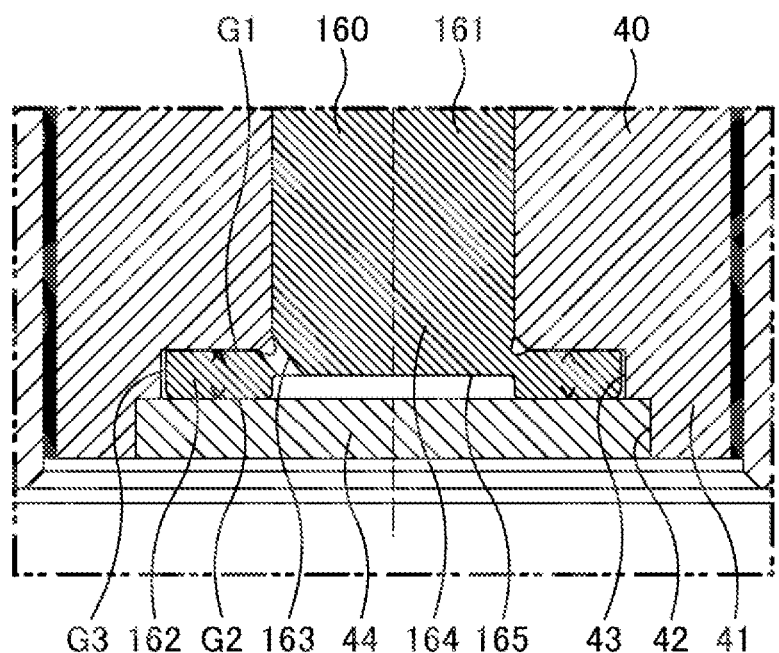
FIG. 5 is an enlarged view of FIG. 2 illustrating the spindle motor 3 having a hole 163 inclined.

The hole 163 does not have to be parallel to the axial direction as illustrated in FIG. 4, but may be inclined with respect to the axial direction as illustrated in FIG. 5. In the above case, the step of removing burrs by electrochemical machining can be omitted by performing drilling processing from the side of the upper minute clearance G1. As a result, the shaft 160 can be manufactured inexpensively.

According to the above-described configuration, since the recess part 165 is formed in the shaft end portion 164, a clearance is formed between the shaft portion 161 and the counter plate 44, and an area (a bearing portion area in the thrust direction) opposed between the shaft 60 and the counter plate 44 with a minute clearance in between is reduced. As a result, since the shaft 60 is easily rotated, the current required for rotating the shaft 60 is reduced, and the current consumption of the spindle motor 3 can be reduced.

In addition, since the recess part 165 is formed in the shaft end portion 164, the length of the hole 163 is shortened, and the processing time of the hole 163 can be shortened. As a result, the shaft 160 can be manufactured inexpensively.

(2) Modification 2

Figure 6:
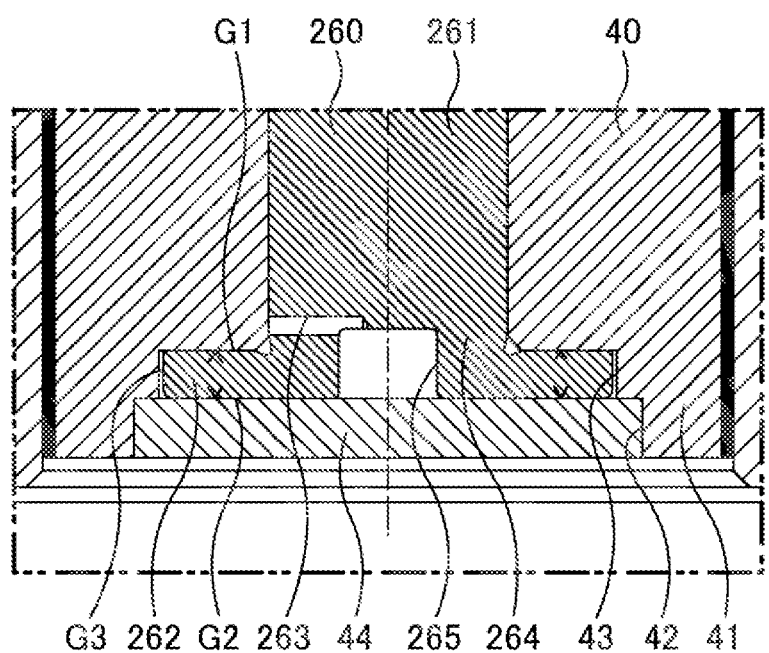
FIG. 6 is an enlarged view of FIG. 2 illustrating the spindle motor 3 including a shaft 260.

The hole 163 and the recess part 165 may have shapes different from the shapes in the first modification. For example, a shaft portion 261 of a shaft 260 is provided with a recess part 265 as illustrated in FIG. 6.

The recess part 265 is formed in a shaft end portion 264 in a circular shape when viewed in the axial direction, and opens downward. The recess part 265 connects to the lower minute clearance G2. The diameter of the recess part 265 is smaller than the outer diameter of the shaft portion 261. The depth of the recess part 265 is greater than the thickness of a flange portion 262. A hole 263 parallel to the radial direction is connected to the recess part 265. The hole 263 is provided in the shaft portion 261 and connects the upper minute clearance G1 to the recess part 265. That is, the upper minute clearance G1 and the lower minute clearance G2 are connected to one another through the hole 263 and the recess part 265.

Figure 7:
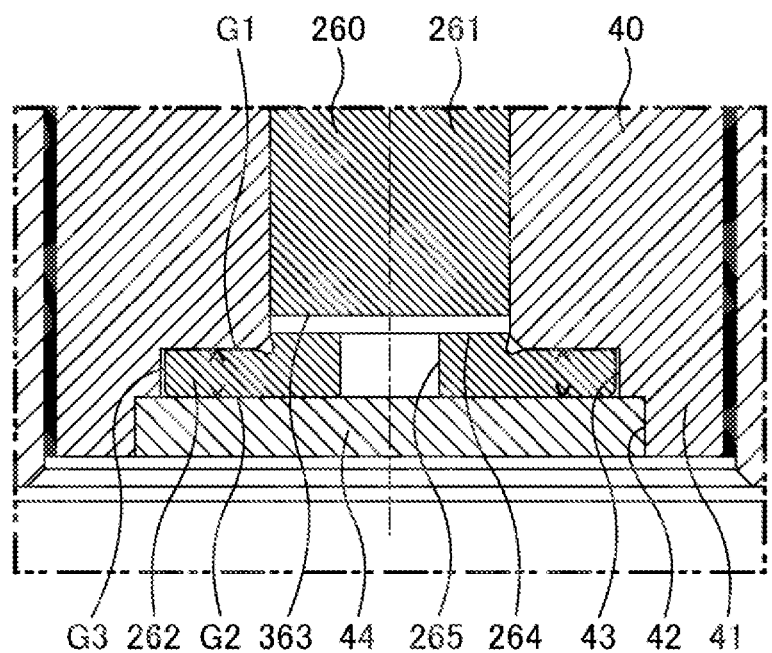
FIG. 7 is an enlarged view of FIG. 2 illustrating the spindle motor 3 having a hole 363 formed in the shaft 260.

The hole 263 may be, for example, a hole 363 illustrated in FIG. 7. The hole 363 is provided in the shaft portion 261 so as to penetrate the shaft portion 261 via the recess part 265.

(3) Modification 3

In the above-described embodiment, the hole 63 is provided in the shaft portion 61 of the shaft 60. However, the hole 63 does not have to be provided in the shaft portion 61.

(4) Modification 4

In the above-described embodiment, the opening parts 63E as the edges of the hole 63 are electrochemically machined. However, the opening parts 63E do not have to be electrochemically machined.

(5) Modification 5

In the above-described embodiment, the thickness of the flange portion 62 in the axial direction is from 0.5 mm to 0.9 mm. However, the thickness of the flange portion 62 in the axial direction may be less than 0.5 mm or greater than 0.9 mm.

(6) Modification 6

In the above-described embodiment, the counter plate 44 is joined to the bearing sleeve 40 by laser welding. However, the counter plate 44 may also be joined to the bearing sleeve 40 by adhesive bonding or press-fitting.

(7) Modification 7

The shaft 60 may be a forged product. The shaft 60 of a forged product has a higher strength than a strength of the shaft 60 of a machined product and is therefore able to support a greater load in the axial direction.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A spindle motor comprising:
a shaft including a shaft member and a flange portion, the shaft member having a columnar shape extending in an axial direction, the shaft member including a shaft end portion, the flange portion being provided at the shaft end portion and receiving a load in the axial direction; and
a bearing sleeve rotatably supporting the shaft, the bearing sleeve having a tubular shape and including a sleeve end portion having a first opening part formed in the axial direction, wherein
the shaft is a member formed of a copper alloy containing from 0.5 mass percent to 1.5 mass percent of silicon and from 0.5 mass percent to 3.0 mass percent of manganese, and the member includes the shaft member and the flange portion integrated with one another.

2. The spindle motor according to claim 1, wherein
the shaft member forms a hole having one end connected to one surface side of the flange portion and another end connected to another surface side of the flange portion.

3. The spindle motor according to claim 2, wherein
at least one of the one end and the other end is formed by an electrochemically machined second opening part.

4. The spindle motor according to claim 1, wherein
the shaft end portion has a recess part having a depth in the axial direction.

5. The spindle motor according to claim 1, wherein
a thickness of the flange portion in the axial direction is from 0.5 mm to 0.9 mm.

6. The spindle motor according to claim 1, further comprising a counter plate laser-welded to the bearing sleeve so as to close the first opening part.

7. A hard disk drive device comprising the spindle motor according to claim 1.

* * * * *